US009762281B2

(12) United States Patent
Moreau et al.

(10) Patent No.: US 9,762,281 B2
(45) Date of Patent: Sep. 12, 2017

(54) TABLET POUCH WITH BUILT-IN TETHER RETRACTOR

(71) Applicant: Ty-Flot, Inc., Manchester, NH (US)

(72) Inventors: Darrell A. Moreau, Manchester, NH (US); Andre W. Moreau, Bedford, NH (US); Reginald J. Moreau, Litchfield, NH (US)

(*) Notice: Subject to any disclaimer, the term of this patent is extended or adjusted under 35 U.S.C. 154(b) by 0 days.

(21) Appl. No.: 15/194,648

(22) Filed: Jun. 28, 2016

(65) Prior Publication Data

US 2017/0049201 A1 Feb. 23, 2017

Related U.S. Application Data

(63) Continuation-in-part of application No. 29/537,063, filed on Aug. 21, 2015, now Pat. No. Des. 788,779.

(51) Int. Cl.
| | |
|---|---|
| A45C 11/00 | (2006.01) |
| H04B 1/3888 | (2015.01) |
| A45C 13/10 | (2006.01) |
| A45F 5/00 | (2006.01) |
| A45F 5/02 | (2006.01) |
| A45F 3/00 | (2006.01) |
| A45C 13/02 | (2006.01) |

(52) U.S. Cl.
CPC ............ *H04B 1/3888* (2013.01); *A45C 11/00* (2013.01); *A45C 13/02* (2013.01); *A45C 13/103* (2013.01); *A45F 3/00* (2013.01); *A45F 5/00* (2013.01); *A45F 5/021* (2013.01); *A45C 2011/003* (2013.01); *A45C 2013/025* (2013.01); *A45F 2003/002* (2013.01); *A45F 2005/006* (2013.01); *A45F 2200/0525* (2013.01)

(58) Field of Classification Search
CPC ........ A45C 2013/025; A45C 2011/003; A45C 13/203; A45C 13/103; A45V 11/00
USPC .......................... 150/100–102, 134, 106, 111
See application file for complete search history.

(56) References Cited

U.S. PATENT DOCUMENTS

| | | | | |
|---|---|---|---|---|
| 2,126,826 A | * | 8/1938 | Shively ................ | A45C 13/185 150/134 |
| 2,908,306 A | * | 10/1959 | Chorost ............... | A45C 13/185 150/134 |
| 5,908,147 A | * | 6/1999 | Chuang ................. | G06F 1/1628 190/100 |
| 6,502,727 B1 | * | 1/2003 | Decoteau ................ | A45F 5/004 224/162 |
| 2005/0189188 A1 | * | 9/2005 | Barnes ................... | A45C 13/02 190/110 |

(Continued)

*Primary Examiner* — Sue A Weaver

(57) ABSTRACT

A pouch for a tablet computer includes a first panel and a second panel attached to the first panel along a lower pouch end, where the pouch is operable between open and closed pouch positions. In the closed pouch position the second panel aligns with the first panel and defines a pouch compartment sized to hold a tablet computer. A closure is installed between the first panel and the second panel. A quantity of padding is disposed on an inside face of the first panel and defines a retractor recess. A retractor pocket is defined within the retractor recess and has a retractor cable opening. A retractor is disposed in the retractor pocket and has a retractor cable operable through the retractor cable opening between a retracted position and an extended position. A connector on the distal cable end is constructed for attachment to the tablet computer.

7 Claims, 11 Drawing Sheets

(56) References Cited

U.S. PATENT DOCUMENTS

| | | | |
|---|---|---|---|
| 2008/0237280 A1* | 10/2008 | Chang | A45C 13/021 224/101 |
| 2011/0259485 A1* | 10/2011 | Burns | A45C 13/02 150/106 |
| 2012/0111912 A1* | 5/2012 | Zheng | A45C 15/00 224/576 |
| 2013/0148295 A1* | 6/2013 | Minn | G06F 1/163 361/679.59 |
| 2014/0182989 A1* | 7/2014 | Daley, III | G06F 1/1628 190/1 |
| 2014/0202885 A1* | 7/2014 | Bell | A45C 11/00 206/37 |
| 2014/0202888 A1* | 7/2014 | Lieblein | A45C 11/00 206/45.23 |
| 2015/0305480 A1* | 10/2015 | Brousseau | A45F 5/10 224/267 |

* cited by examiner

Figure 6
Figure 7
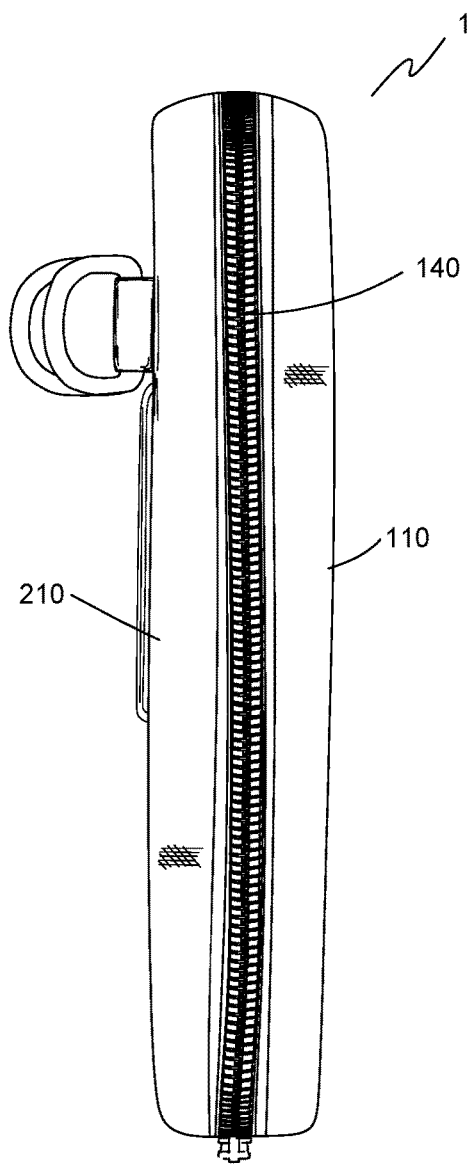
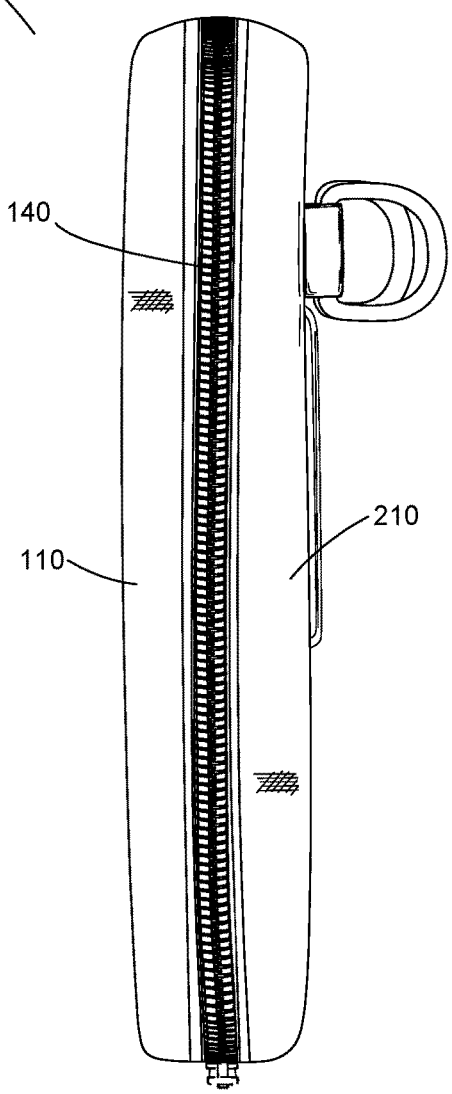

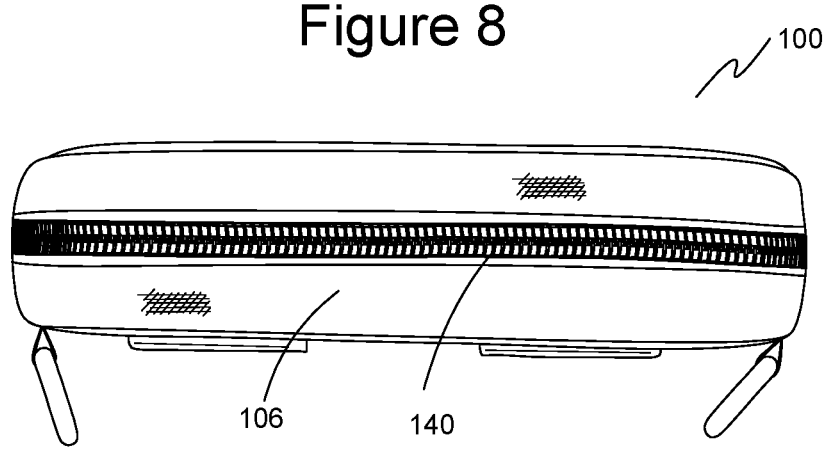
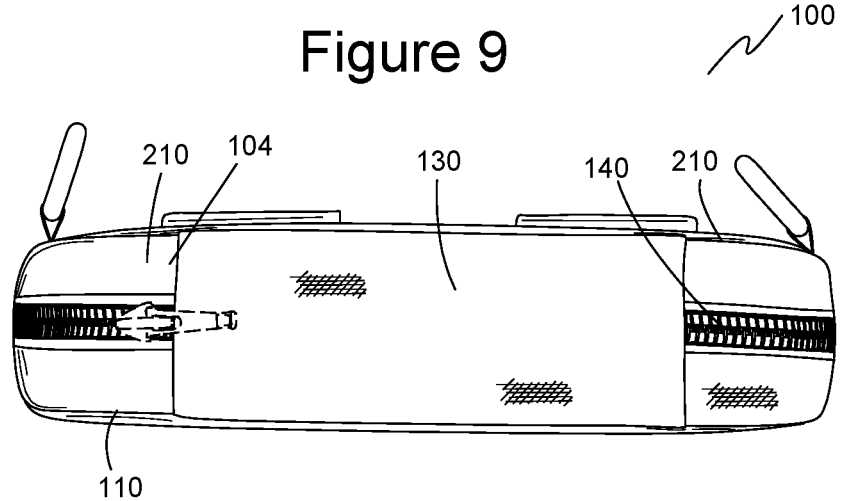

TABLET POUCH WITH BUILT-IN TETHER RETRACTOR

BACKGROUND OF THE INVENTION

1. Field of the Invention

The present invention relates generally to pouches and cases. More particularly, the present invention relates to a pouch for tablet computers.

2. Description of the Prior Art

The use of tablet computers on the jobsite is more and more frequent among carpenters, electricians, facilities maintenance personnel, and other workers. Many pouches and cases have been designed for carrying tablet computers and protecting the tablet computer from damage when the cased computer is dropped or subjected to impact.

One pouch for a tablet computer is a neoprene sleeve with a fold-over flap closure. The pouch is constructed similar to an envelope for full-sheet documents and allows the user to insert the computer into the sleeve when it is not in use. The sleeved computer is then placed in a briefcase or backpack or carried by itself between uses.

Another example of a cover for a tablet computer is a sport case or folio-type cover. The case may be made of leather, fabric, neoprene rubber or other materials as desired to provide protection to a tablet placed inside the folio on one of the folio's panels. When opened, the tablet computer is retained on the inside face of one of the halves of the cover. For example, the tablet computer is held into the case with elastic straps that extend diagonally across the corners of the panel. Like a paper folio folder placed on a table or other work surface, the user simply folds open the two panels of the case to access the computer. When not in use, the case is folded closed. In some embodiments, the folio cover is retained closed by a flap or zipper. The user generally carries the folio in the user's hand or stowed in a backpack or briefcase.

Other bags and cases have been developed for use with a tablet computer, such as messenger-type bags and variants of the sleeve and folio-type cases. The prior art also includes carrying cases and pouches for tools and equipment, such as an electrician's pouch that is designed with pockets, strap loops, and slots to hold a multimeter and a small number of other tools.

SUMMARY OF THE INVENTION

Although the bags, cases, and sleeves of the prior art address the desire for a carrying case that protects a tablet computer, none of the prior-art cases is configured for use of the computer while the case or pouch is attached to the user's belt. Similarly, none of the prior-art pouches and cases addresses the problem of preventing accidental drops of the computer when being used with the pouch attached to the user's belt, such as when the computer is removed, used, and then replaced into the pouch. Particularly for workers who use tablet computers, multimeters, and test equipment at height, a dropped computer or device can cause damage to equipment and grave harm to workers below.

Thus, a need exists for a pouch that addresses tethering the tablet computer or other electronic equipment to the pouch. Therefore it is an object of the present invention to provide a pouch for tablet computers and other electronic equipment that includes a retractable tether originating from inside the pouch.

The present invention achieves these and other objectives by providing a pouch with a retractable tether. In one embodiment, a pouch for a tablet computer includes a first panel and a second panel hingedly attached to the first panel along a pouch end, where the pouch is operable between an open and closed pouch positions. In the closed pouch position the second panel aligns with the first panel and defines a pouch compartment sized to hold a tablet computer. A closure is installed between the first panel and the second panel. A quantity of padding is disposed on an inside face of the first panel and defines a retractor recess. A retractor pocket is defined within the retractor recess and has a retractor cable opening. A retractor is disposed in the retractor pocket and has a retractor cable operable through the retractor cable opening between a retracted position and an extended position. A connector on the distal cable end is constructed for attachment to the tablet computer.

In one embodiment, the retractor recess is centrally located on the first panel and framed on four sides by the padding.

In another embodiment, the retractor recess includes an open space adjacent to the retractor pocket and sized to receive the connector on the distal cable end. In one embodiment, the connector is an adhesive patch.

In another embodiment, the pouch includes one or more folding stays extending between the first panel and the second panel. The folding stays permit the first panel to open to a maximum angle defined between the first panel and the second panel in the open pouch position. In one embodiment, the maximum angle is from about 45 to about 70°.

In another embodiment, the pouch includes one or more implement holder attached along the first perimeter or along the second perimeter.

BRIEF DESCRIPTION OF THE DRAWINGS

FIG. 6 illustrates a right-side elevational view of the pouch of FIG. 1 shown in the closed pouch position.

FIG. 7 illustrates a left-side elevational view of the pouch of FIG. 1 shown in the closed pouch position.

FIG. 8 is a top plan view of the pouch of FIG. 1 showing the releasable closure in a closed position.

FIG. 9 is a bottom plan view of the pouch of FIG. 1 showing the hinge attached along a bottom end of the pouch.

DETAILED DESCRIPTION OF THE PREFERRED EMBODIMENT

Figure 1:
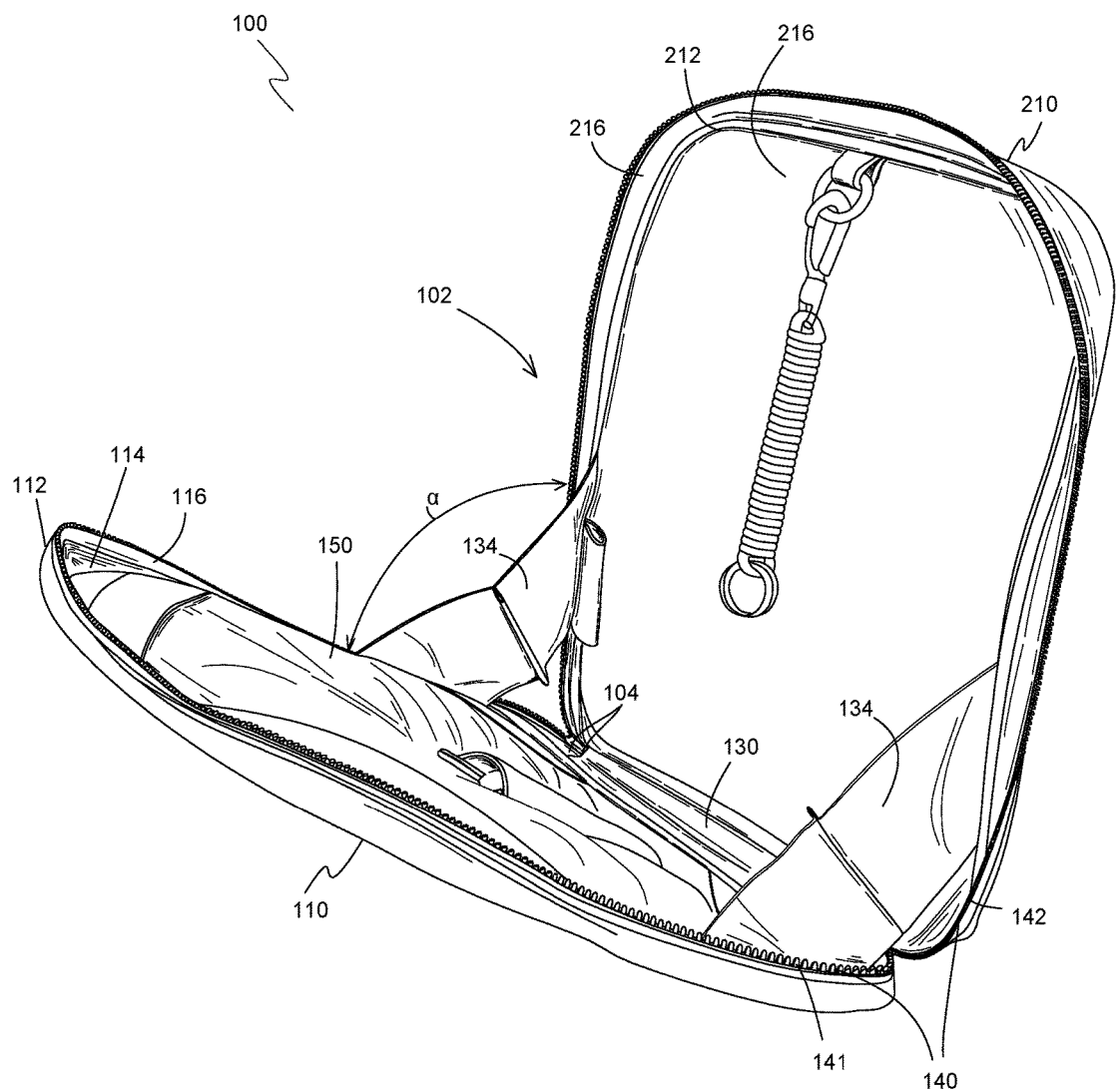
FIG. 1 is a front and side perspective view of one embodiment of a pouch of the present invention shown in an open pouch position.

The preferred embodiments of the present invention are illustrated in FIGS. 1-13. FIG. 1 illustrates a side and front perspective view of one embodiment of a pouch 100 with a first panel 110 attached by a hinge 130 along a lower pouch end 104 to a second panel 210. First panel 110 has a first rim 116 that extends transversely from a first perimeter 112 of first panel 110. Second panel 210 has a second rim 216 that extends transversely from second perimeter 212, where first rim 116 and second rim 216 extend towards each other when pouch is in the closed pouch position. First and second panels 110, 210 fold or hinge between an open pouch position (as shown in FIG. 1) and a closed pouch position (shown, e.g., in FIGS. 6-9), where panels 110, 210 and rims 116, 216 align in the closed pouch position to define pouch compartment 102 sized and shaped for a tablet computer or other similarly-shaped device. Accordingly, in one embodiment, first panel 110 and second panel 210 both have a generally rectangular shape with rounded corners.

In one embodiment, hinge 130 is a strip of fabric attached between first rim 116 and second rim 116 along lower pouch end 104. Other types of hinges are acceptable, including metal or plastic hinges known in the art.

Pouch 100 includes one or more folding stays 134 connected between first panel 110 and second panel 210. In the open pouch position, folding stay(s) 134 extend unfolded between first panel 110 and second panel 210 to retain first panel 110 in a predefined, open position in which first panel 110 does not open more than allowed by folding stays 134 in their extended state. In the open pouch position, pouch 100 defines a maximum angle α between first panel 110 and second panel 210. In one embodiment, maximum angle α is about 60°. Maximum angle α of about 45-70° has been found to be convenient for using first panel 110 as a support tray for a tablet computer when second panel 210 is maintained substantially vertical, such as when pouch 100 is attached to the user's belt or suspended around the user's neck. In one embodiment, pouch 100 has two folding stays 134 connected between first perimeter 112 and second perimeter 212 on each side of pouch 100. In one embodiment, folding stay(s) 134 are made of a pliable material that allows the folding stay 134 to collapse on itself as pouch 100 is converted to the closed pouch position. For example, folding stay(s) 134 are made of fabric, webbing, leather, or other materials. In other embodiments, such as when pouch is made of rigid materials, folding stay(s) 134 are made of metal, plastic, or other rigid materials and have a hinge or folding action.

A releasable closure 140 is installed between first panel 110 and second panel 210 and is operable between an open closure position (as shown) and a closed closure position (shown, e.g., in FIGS. 6-9). Examples of releasable closure 140 include one or more zippers, one or more fabric flaps with fasteners, one or more latch, and the like. A first closure part 141 (e.g., first zipper part) is secured along first rim 112 and second closure part 142 (e.g., second zipper part) is secured along second rim 212. In one embodiment, releasable closure 140 extends along first perimeter 112 and second perimeter 212 except where hinge 130 is located.

Figure 2:
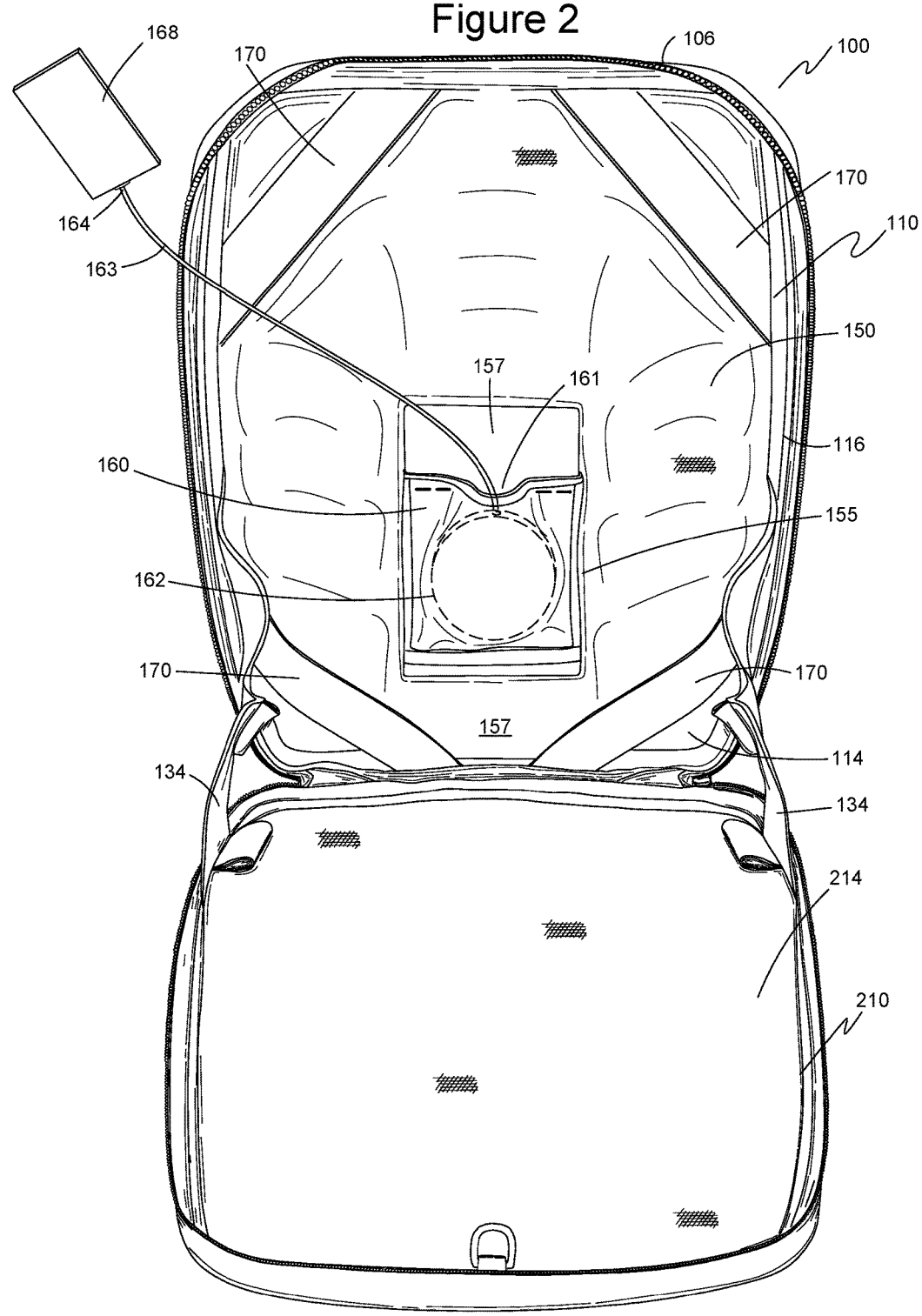
FIG. 2 illustrates the pouch of FIG. 1 as viewed looking at the first panel and showing the retractor cable extending from a the retractor pocket.

Referring now to FIG. 2, a perspective view illustrates pouch 100 of FIG. 1 in the open pouch position as viewed looking at first panel 110. A quantity of padding 150 is disposed on a first inside face 114 of first panel 110. Padding 150 defines a retractor recess 155 within which is a retractor pocket 160. In one embodiment, retractor recess 155 is centrally located on first panel 110 and framed on three or four sides by padding 150. In one embodiment, padding 150 is made of foam or pillow filling material retained by a fabric cover.

Retractor pocket 160 retains a retractor 162 with a retractable cable 163. In one embodiment, retractor pocket 160 is a fabric panel attached to first inside face 114 of first panel 110 that encloses a retractor 162 and defines retractor opening 161. A connector 168 is attached to a distal end 164 of retractor cable 163 and is constructed to be attached to the tablet computer (not shown). Retractor cable 163 operates through retractor cable opening 161 between a retracted position as shown in FIG. 1 and an extended position as shown in FIG. 2. Connector 168 is constructed to securely attach to a tablet computer. For example, connector 168 is an adhesive pad that adheres strongly to the smooth rear face of a tablet computer. Connector 168 in other embodiments is a split ring, a carabiner, a strap loop, or other device that engages the tablet computer.

In some embodiments, retractor recess 155 is located adjacent first rim 116 or other location on first panel 110. For example, padding 150 defines an fl-shape, where the open area inside the fl is retractor recess 155 and is positioned adjacent hinge 130. Padding 150 provides a soft, protective surface for a tablet computer and spaces the tablet computer from first inside face 114 of first panel 110. A tablet computer is a mobile computer with a touchscreen display, circuitry, and battery in a single device that accepts input registered as touches to the touch screen rather than via a keyboard or mouse. Tablet computers typically have a display screen of at least 7" as measured diagonally, such as the Apple iPad® and Samsung Galaxy Tab® computers.

This spacing is useful in part to protect the tablet computer from impact to first panel 110. The spacing of padding 150 also in part defines retractor recess 155 with a depth sufficient to retain retractor 162 in retractor pocket 160 without marring the surface of the tablet computer. The spacing provided by padding 150 further allows connector 168 attached to the tablet computer to occupy an open space 157 on first panel 110 between the tablet computer, padding 150, first inside face 114, and retractor pocket 160. In some embodiments, open space 157 is alternately or additionally located between retractor pocket 160 and hinge 130 on first panel 110.

First panel 100 optionally includes one or more retaining straps 170 extending over padding 150 between adjacent or opposite perimeter edges. For example, first panel 110 has one retaining strap 170 extending diagonally across each corner of first panel 110 and made of elasticized webbing. In another embodiment, retaining straps 170 extend horizontally across first panel 110 between right and left sides adjacent hinge 130 and adjacent upper pouch end 106. Other retention straps 170 known in the art may also be used. In one embodiment, retaining straps 170 are adjustable to accommodate tablet computers of different sizes.

Figure 3:
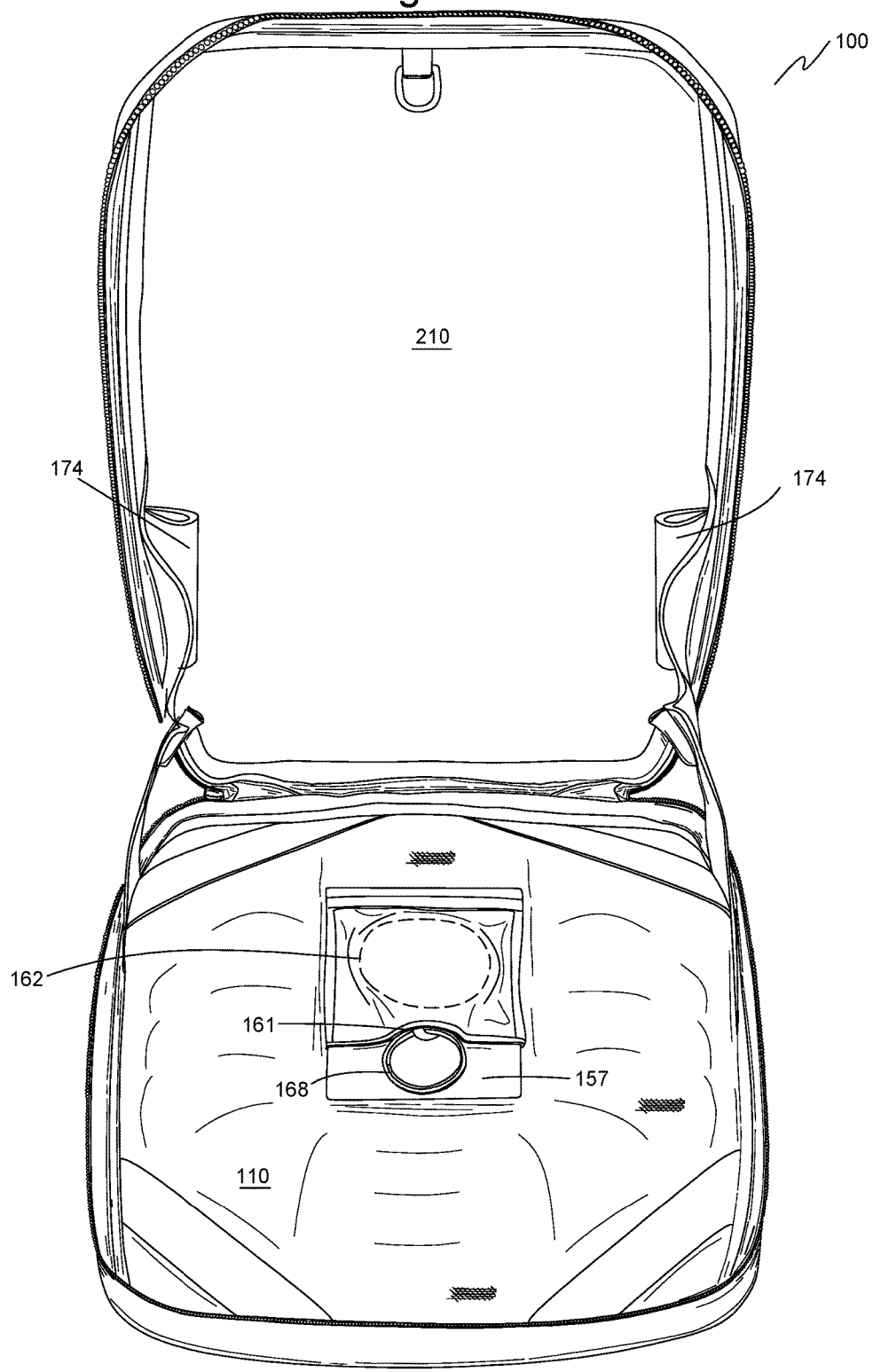
FIG. 3 illustrates a view looking at the second panel of the pouch of FIG. 1 and shows implement holders attached along the perimeter of the second panel and the retractor cable in a retracted position.

Referring now to FIG. 3, a perspective view illustrates pouch 100 of FIG. 1 in the open pouch position as viewed looking at second panel 210. Retractor cable 163 (shown in FIG. 2) is in the retracted position with retractor cable 163 coiled in retractor 162 and connector 168 retained in open space 157 at retractor cable opening 161. Second panel 210 optionally includes one or more implement holder 174 useful for holding a stylus or writing implement. In one embodiment, implement holder 174 is a tube attached along second perimeter 212.

Figure 4:
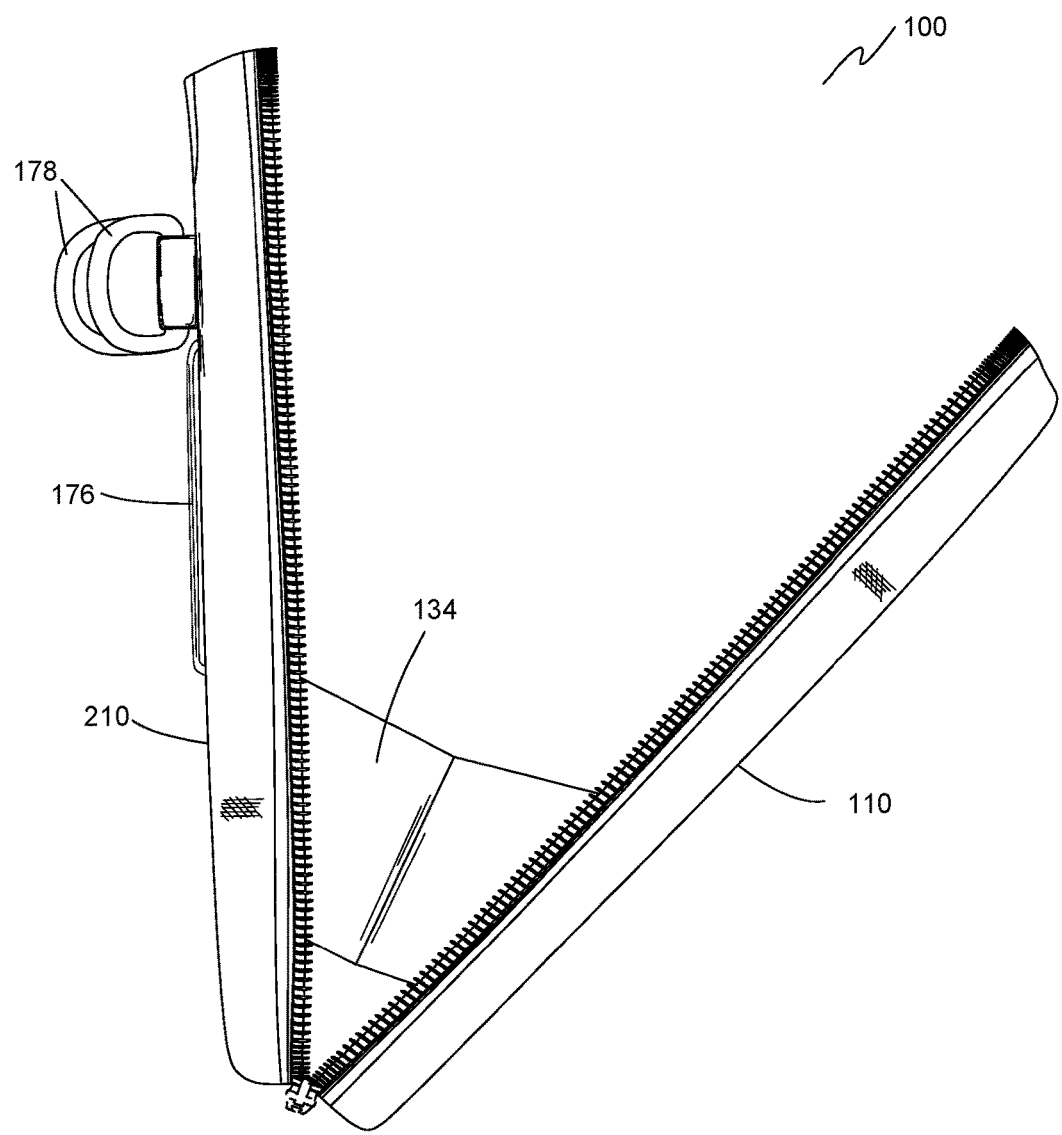
FIG. 4 illustrates a right-side elevational view of the pouch of FIG. 1 shown in the open pouch position.
Figure 5:
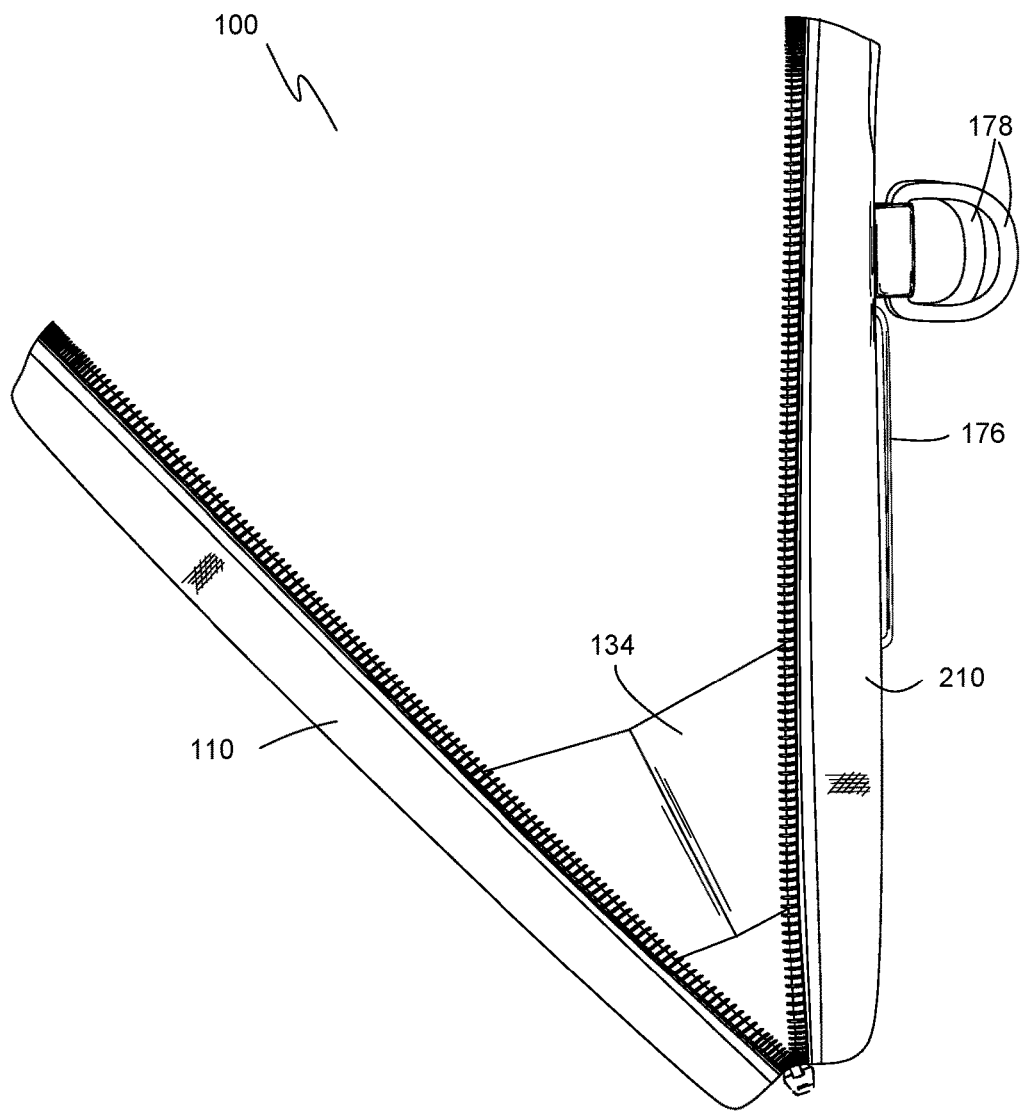
FIG. 5 illustrates a left-side elevational view of the pouch of FIG. 1 shown in the open pouch position.

Referring now to FIGS. 4 and 5, right-side and left-side elevational views, respectively, show an embodiment of pouch 100 in the open pouch position. Second panel 210 is shown in a generally vertical position as may occur when pouch 100 is attached to the user's belt by belt loops 176 or when suspended around a user's neck by carrying strap 182 (shown in FIG. 13) attached to connectors 178 on second panel 210. First panel 110 is open and retained in a maximum open position by folding stays 134 that extend between first panel 110 and second panel 210. In the open pouch position, first panel 110 supports the tablet computer (not shown) in a position where it can be seen and accessed by the user while attached to the user.

Referring now to FIGS. 6 and 7, right-side and left-side elevational views, respectively, show an embodiment of pouch 100 in the closed pouch position. Releasable closure 140 is a zipper in the closed position and retains first panel 110 aligned with second panel 210. Releasable closure 140 may be opened to remove the tablet computer (not shown) from pouch 100 or to access and use the tablet computer supported by first panel 110.

Referring now to FIGS. 8 and 9, top and bottom end views, respectively, shown an embodiment of pouch 100 in the closed pouch position. As shown, releasable closure 140 is a zipper in the closed position. FIG. 8 shows releasable closure 140 closed across upper pouch end 106. FIG. 9 shows hinge 130 as a fabric panel extending along lower pouch end 104 between first panel 110 and second panel 210.

Figure 10:
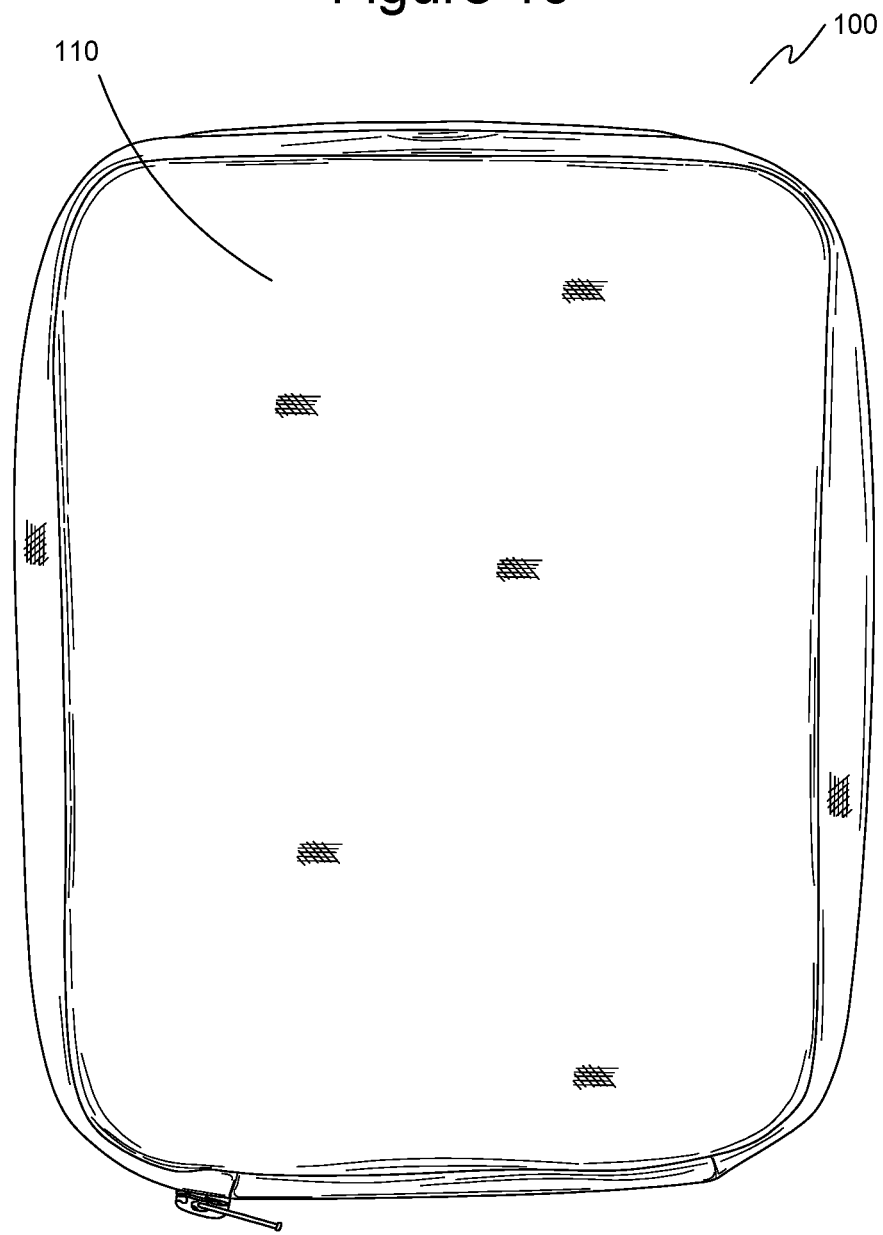
FIG. 10 illustrates a front elevational view of the pouch of FIG. 1 shown in a closed pouch position.
Figure 11:
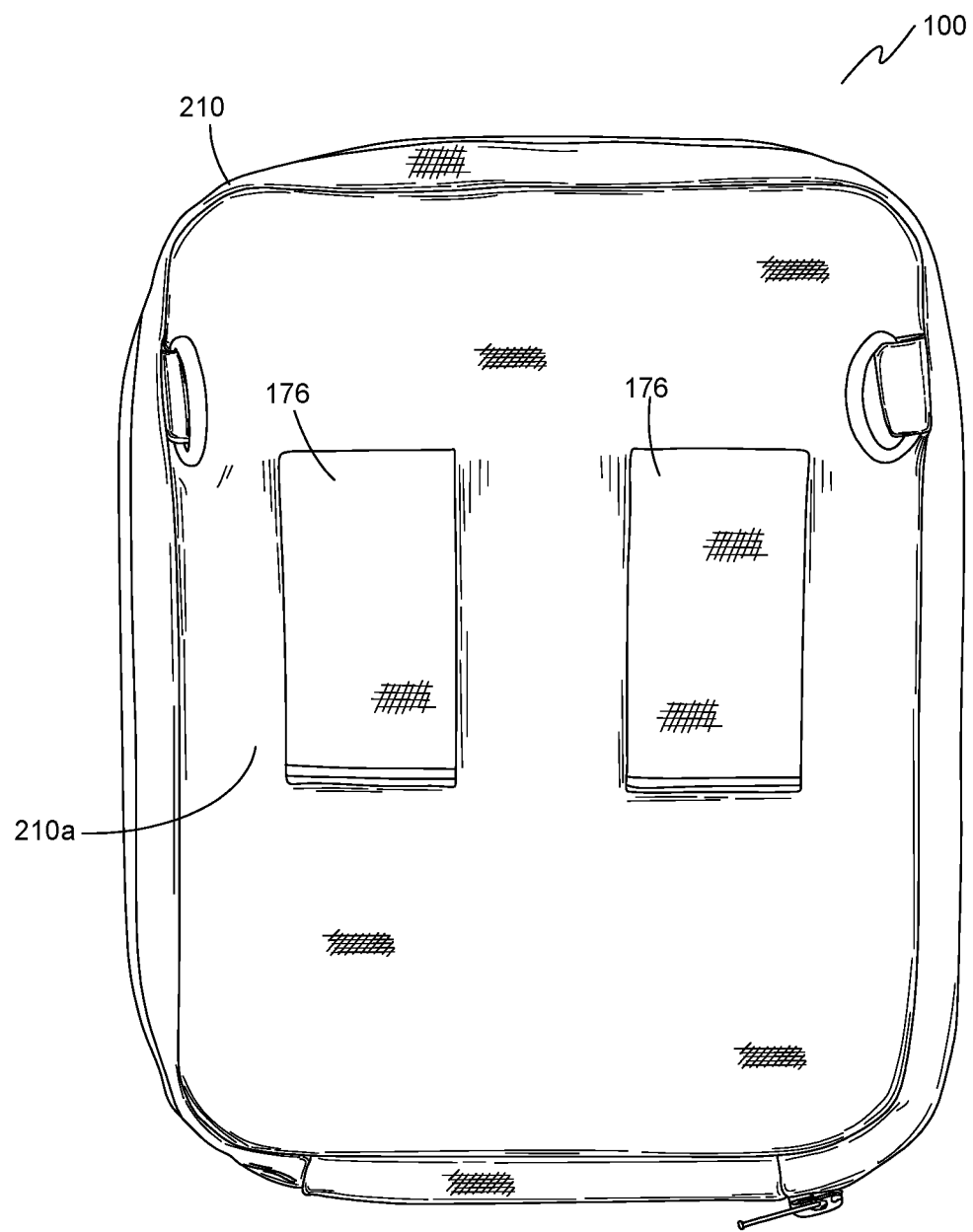
FIG. 11 illustrates a rear elevational view of the pouch of FIG. 1 showing belt loops attached to the outside or rear surface of the first panel.

Referring now to FIGS. 10 and 11, front and rear elevational views, respectively, show an embodiment of pouch 100 in the closed pouch position. FIG. 11 shows belt loops 176 attached to outside surface 210a of rear panel 210.

Figure 12:
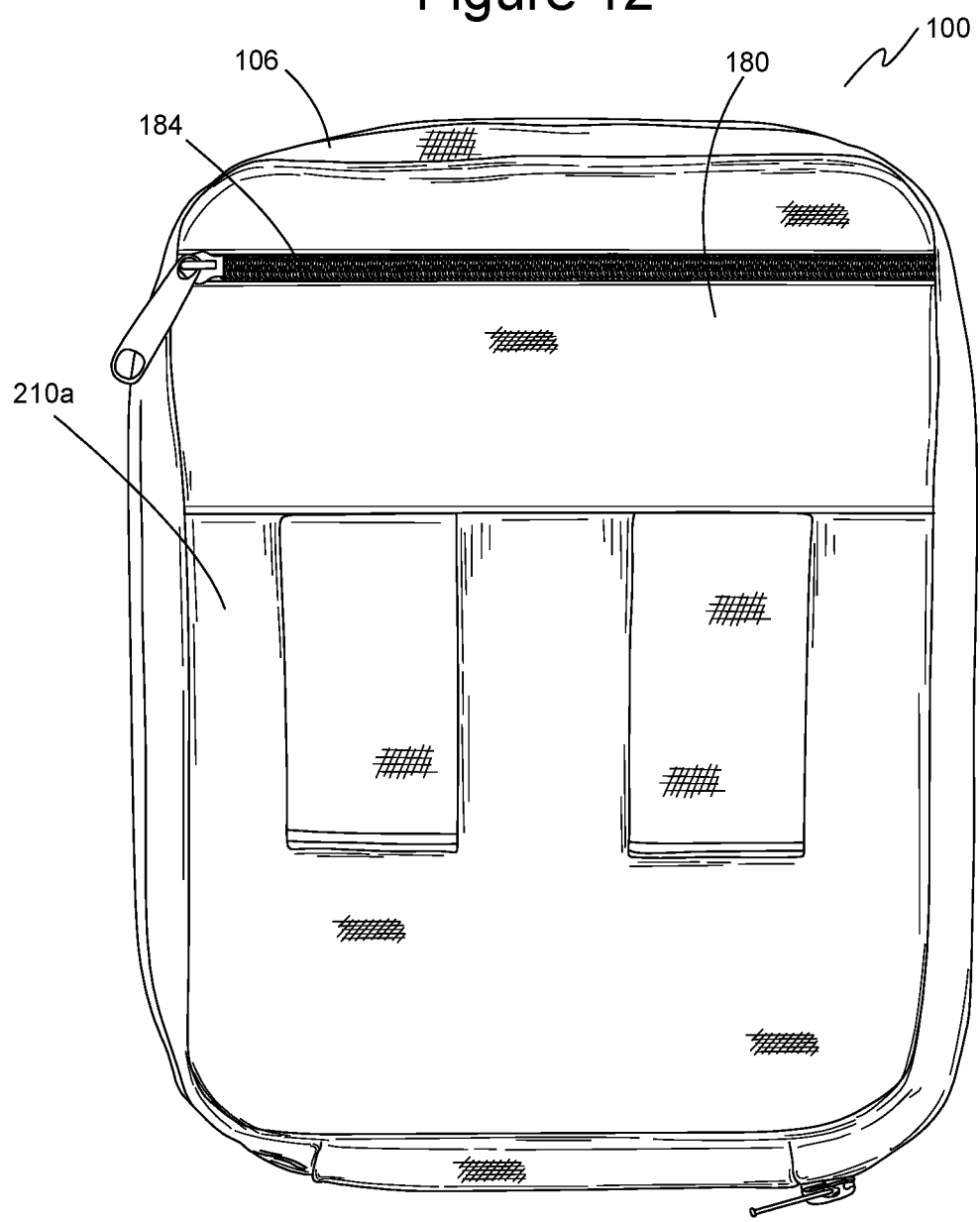
FIG. 12 illustrates a rear elevational view of another pouch of the present invention showing a pocket on the outside surface of the first panel.
Figure 13:
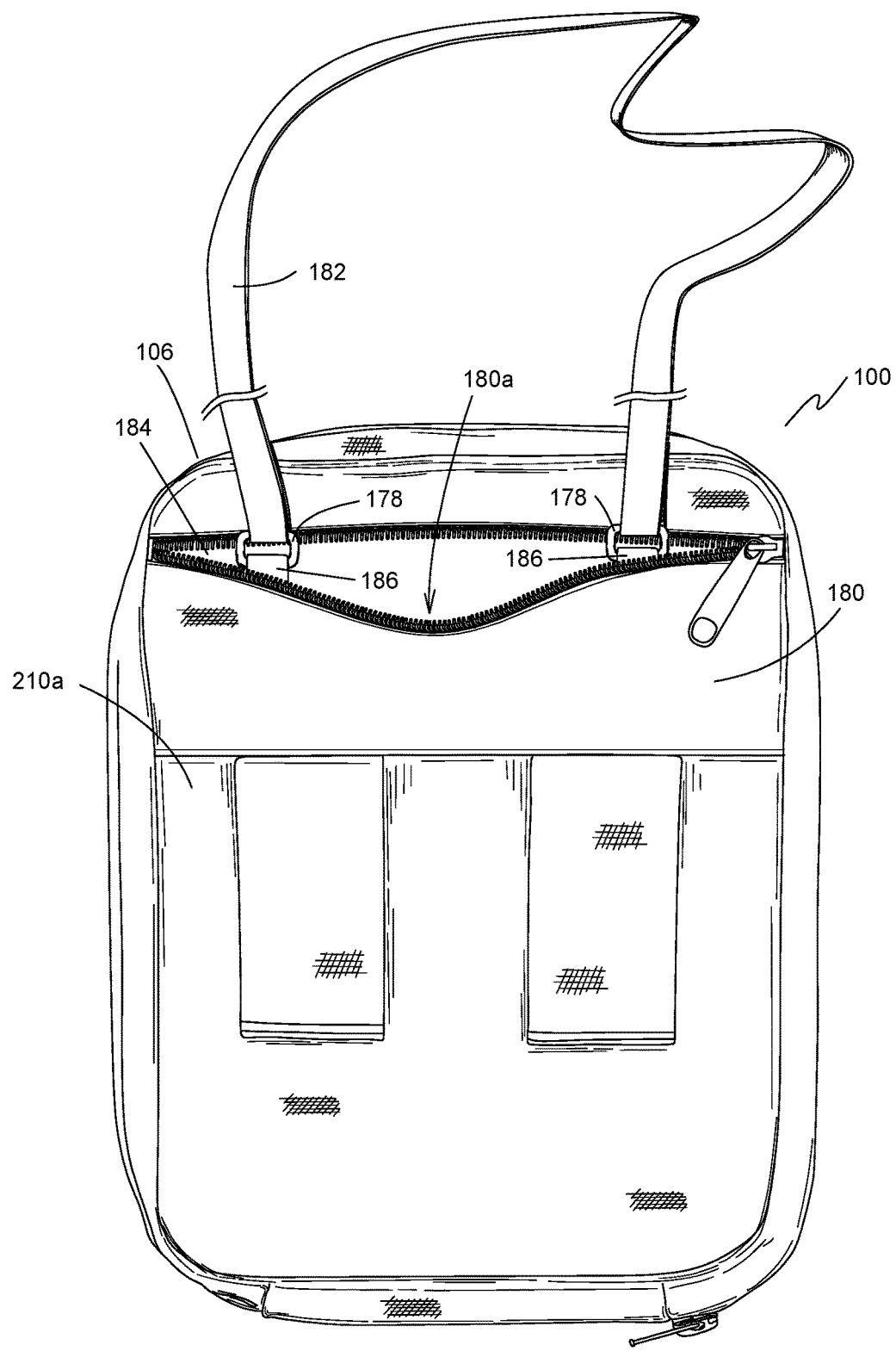
FIG. 13 illustrates a rear elevational view of the pouch of FIG. 12 showing the pocket in an open position and a carrying strap deployed from the pocket.

Referring now to FIGS. 12 and 13, rear elevational views show another embodiment of pouch 100 with a pocket 180 and a carrying strap 182 deployable from within pocket 180. Pocket 180 is located on an outside surface 210a of second panel 210 with pocket opening 184 adjacent upper pouch end 106. FIG. 12 shows pocket 180 in a closed pocket position with carrying strap 182 (not visible) stowed inside pocket 180. FIG. 13 shows pocket 180 in an open pocket position with carrying strap 182 deployed. Carrying strap 182 connects to connectors 178 retained inside pocket 180. For example, connectors 178 attach to fabric loops 186 secured to an inside of pocket 180. In some embodiments, carrying strap 182 has an adjustable length and may be removable from connectors 178.

In use, embodiments of pouch 100 are useful to retain and protect a tablet computer or similarly-shaped device. Additionally, pouch 100 has the advantage of providing a work surface on first panel 100 when first panel 100 is retained in a maximum open position by folding stays 134. One intended use includes the user securing connector 168 to the tablet computer. For example, when connector 168 is an adhesive pad, the user attaches connector 168 to the back surface of the tablet computer using the connector's adhesive surface. With connector 168 attached, the tablet computer is tethered to pouch 100. The user then retains the tablet computer against first panel 110 by placing the tablet computer against first panel 110 and positioning retaining straps 170 to extend over corners of the tablet computer. Thus, when the user wears pouch 100 attached to a belt or suspends pouch 100 about the neck, the user converts pouch 100 to the open pouch position to access and use the tablet computer retained on first panel 100. The user may also remove the tablet computer from pouch 100 for use and then replace it into pouch when the task is completed. In the event that the tablet computer becomes dislodged from pouch 100 or the user drops the tablet computer when it is removed from pouch, retractor 162 tethers the tablet computer to pouch and prevents the tablet computer from falling.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

We claim:

1. A pouch for a tablet computer comprising:
   a first panel defining a first perimeter;
   a second panel defining a second perimeter, the second panel being hingedly attached to the first panel along a lower pouch end, wherein the first panel and the second panel are hingedly operable between an open pouch position and a closed pouch position, wherein the second panel aligns with the first panel in the closed pouch position and defines a pouch compartment sized to hold a tablet computer;
   a releasable closure installed between the first panel and the second panel and operable between a first closure position and a second closure position, wherein the releasable closure in the second closure position maintains the first panel and the second panel in the closed pouch position;
   a quantity of padding disposed on an inside face of the first panel, wherein the quantity of padding defines a retractor recess;
   a retractor pocket defined within the retractor recess and defining a retractor cable opening; and
   a retractor disposed in the retractor pocket and having a retractor cable with a distal cable end, wherein the retractor cable is operable through the retractor cable opening between a retracted position and an extended position; and
   a connector on the distal cable end and constructed for attachment to the tablet computer.

2. The pouch of claim 1, wherein the retractor recess is centrally located on the first panel and framed on four sides by the quantity of padding.

3. The pouch of claim 2, wherein the retractor recess includes an open space adjacent to the retractor pocket and sized to receive the connector on the distal cable end.

4. The pouch of claim 1, wherein the connector is an adhesive patch.

5. The pouch of claim 1 further comprising one or more folding stays extending between the first panel and the second panel, wherein the one or more folding stays permit the first panel to open to a maximum angle defined between the first panel and the second panel in the open pouch position.

6. The pouch of claim 5, wherein the maximum angle is from about 45° to about 70°.

7. The pouch of claim 1 further comprising one or more implement holder attached along the first perimeter or along the second perimeter.

* * * * *